Figure 1:
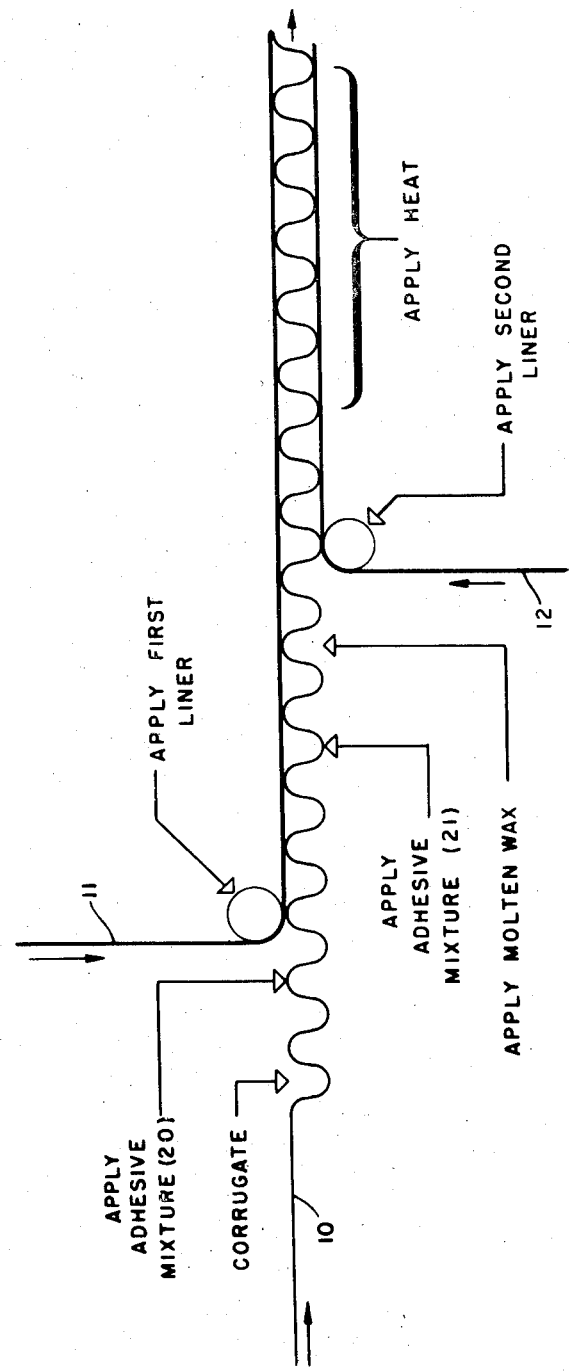

INVENTOR.
JOHN R. LITTLE

United States Patent Office 2,982,333
Patented May 2, 1961

2,982,333

WAX-IMPREGNATED CORRUGATED PAPERBOARD CONSTRUCTION AND METHOD FOR MANUFACTURING WAX IMPREGNATED CORRUGATED PAPERBOARD

John R. Little, Sandusky, Ohio, assignor to West Virginia Pulp & Paper Company, New York, N.Y., a corporation of Delaware Filed Jan. 7, 1959, Ser. No. 785,408

6 Claims. (Cl. 154—33.05)

This invention relates to the manufacture of corrugated paperboard having increased moisture resistance by the inclusion therein of a hot-melt impregnation. Certain aspects of the invention relate also to an improved wax-impregnated corrugated paperboard construction. Corrugated paperboard made according to the invention is useful for fabricating cartons and the like.

A great deal of effort has been made in trying to waterproof corrugated board by sprayed interior and exterior coatings of moisture impervious films and impregnants for the paperboard stock.

In connection with the improvement of the moisture resistance of corrugated paperboard, there have been disclosed from time to time adhesives of improved moisture-resistance properties, as for example in Caesar et al. U.S. Patent 2,463,148. Such developments are to be distinguished from the improvement of the moisture resistance of the paper webs themselves. For example, in the Caesar et al. patent, supra, it is recognized near the bottom of column 7 that the advantages of the improved adhesive "may be enhanced by also treating the plies of strips to render them water-resistant."

The improvement of the moisture resistance of the paper webs themselves has been commercially achieved to a limited extent by a process known in the industry as "dry waxing." See "The Chemistry and Technology of Waxes," by Albin H. Warth, Reinhold Publishing Corp., 1947, p. 433. Dry waxing of corrugated board involves a coating operation during the manufacture of the corrugated board, such coating operation occurring after the single-face liner is formed and while it is warm and comprising the application of paraffin at the rate of about 5 pounds per thousand square feet to the outer face of the single-face liner. The wax tends to fill up the spaces between the paper fibers.

It is also conventional to take corrugated double-face paperboard and coat one or both faces with paraffin at the rate of about 5 pounds per thousand square feet. This is "wet waxing," that is, the application of a continuous film to the surface of the board. This process tends to increase the moisture resistance of the paper in that the coating film blankets the fibers on one surface of the liner. Substantial permeation does not occur because the corrugated paperboard has been fabricated and is relatively cool when treated.

Another practice of the industry may be mentioned which is not a moistureproofing process but which is relevant to the extent that it involves the application of small amounts of wax to the corrugated ply of the corrugated paperboard. This is the practice of applying a very thin coat of paraffin to the tips or crests of the flutes on a corrugating roll. This is done for lubrication purposes so that the corrugated sheet will not stick to the corrugating rolls but will readily separate therefrom. An example is found in Schoo U.S. Patent 1,796,542. It is to be noted that the paraffin bearing films of the corrugating roll contact the valleys of the corrugated web. It is further noted that there is employed only approximately one ounce of paraffin per thousand square feet of paper which is very short of an amount which accomplishes any significant web penetration. In current practice in the industry, the paraffin of Schoo has been largely replaced by "paraffin oil."

An object of the present invention is to improve the moisture resistance of a corrugated paperboard structure by directly impregnating the corrugated web with a molten-wax paper-penetrant during corrugation and combining of the corrugated paperboard. According to one important aspect of the invention, total or partial impregnation of the liner webs may also be allowed to occur.

Another object of the invention is to improve the strength of corrugated paperboard by wax impregnation during corrugation and combining of the corrugated paperboard. In this connection, I am aware of prior proposals to pre-treat the corrugating web of corrugated paperboard to improve service characteristics, as for example in McKee U.S. Patent 2,568,349.

Another object of the invention is to make possible excellent printability on a wax-impregnated corrugated paperboard.

I have discovered that bodied unset heat-activatable free-water-containing adhesive mixtures, including starch, silicate, and silicate-clay adhesive mixtures heretofore employed in the industry for adhering the corrugated web to the liner webs in the manufacture of corrugated paper, may be applied to the exposed crests of a corrugated web prior to the application to such web from the same side thereof of a molten-wax paper-penetrant and that, despite the later application of the molten-wax paper-penetrant, the corrugated web may be successfully combined with a facer web without impairing adhesion. The bodied unset adhesive mixture is a wax-resist and prevents the molten-wax paper-penetrant from contacting that portion of the corrugated web flutes which are previously coated with adhesive, namely, the tips or crests of the flutes, thus permitting the normal function of the adhesive with respect to the corrugated web. Furthermore, the paper-penetrant, even though applied after the adhesive mixture, is prevented (apparently by the wax-resist character of the adhesive mixture) from acting as a barrier to the bonding contact of the adhesive mixture with the liner web which is thereafter applied to the crests of the corrugated web in the presence of heat. It is not clear whether the applied paper-penetrant covers the adhesive and is remelted or mechanically broken or mechanically expressed when the facing sheet is applied or whether the applied paper-penetrant substantially leaves exposed the adhesive deposits at the time of initial application of the paper-penetrant. That is, on a theoretical basis the present invention is not wholly understood, but on an empirical basis it has been discovered to work successfully.

Another important feature of the invention is the provision of a new corrugated paperboard having improved moisture resistance and strength. The new corrugated paperboard of the invention may or may not comprise paper webs, adhesives and wax paper-penetrants (and other paper treating agents, if any) identical both qualitatively and quantitatively to those of the prior art. Even if there is such qualitative and quantitative identity of the components of the paperboard, the moisture resistance and strength properties are significantly improved over the prior art when the components are given the interrelationship taught and contemplated by the present invention.

There is involved the concept of providing a wax concentration in the liners, or at least in one liner, which is less than the wax concentration under equilibrium conditions and also providing a wax concentration in the medium which is greater than the wax concentration under equilibrium conditions. For the purposes of this patent specification and as contemplated by the invention, "equilibrium condition" refers to a condition that need never be attained and ordinarily never is attained. The converse term "non-equilibrium condition" refers therefore to a condition which lasts indefinitely, absent exposure of the product to a highly specialized environment which is capable of causing degradation of the product to such equilibrium condition. It will therefore be understood that the non-equilibrium condition is not a transitory condition but is rather a condition that ordinarily lasts indefinitely.

Corrugated paperboard embodying this feature of the invention may be manufactured either by the process contemplated by the invention or by other appropriate processes. Also it is to be noted that such paperboard does not inevitably result from the process of the present invention.

Figure 2:
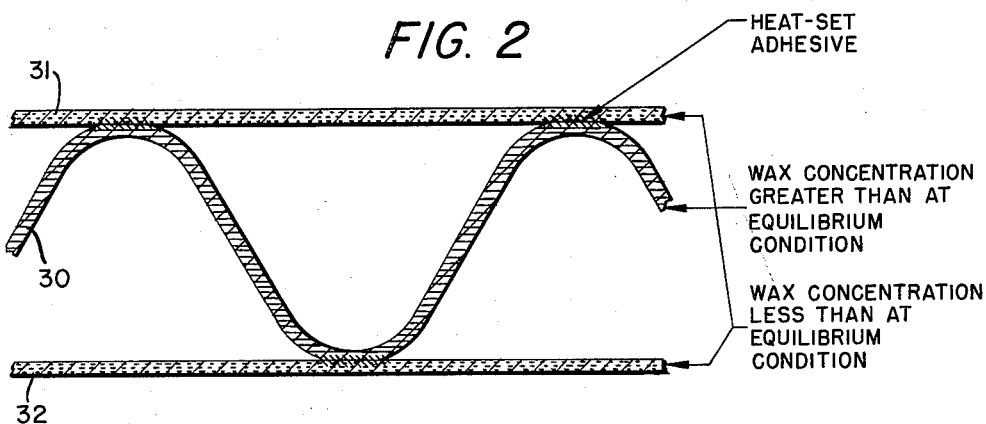
Figure 3:
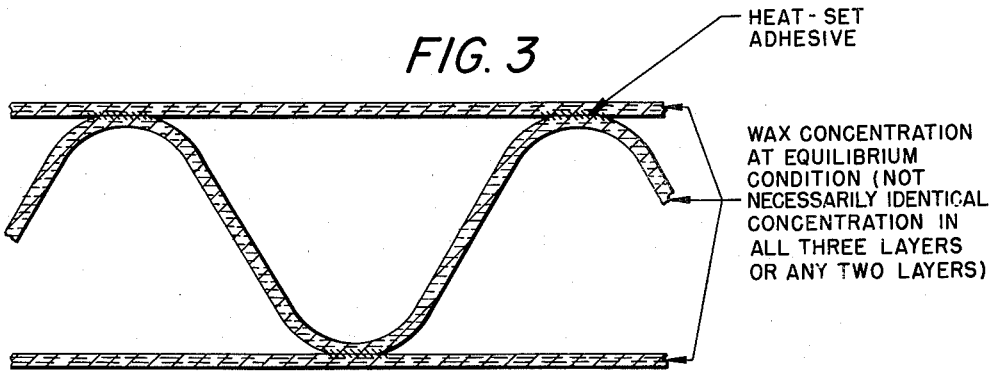

In the drawings, Figure 1 is a schematic showing of the various steps in the manufacture of a corrugated paperboard in accordance with a practice contemplated by the invention. Figures 2 and 3 are schematic illustrations of corrugated paperboard construction contemplated by the invention.

As indicated in Figure 1, according to my invention a paper web 10 which is to become the corrugated web in a corrugated paperboard is first corrugated on a corrugating roll, an adhesive mixture 20 and first liner 11 being applied thereto during the engagement of the web 10 on the corrugating roll in the conventional manner. Examples of arrangements for corrugating and applying the adhesive mixture and the first liner 11 are shown, for example, in Figure 3 of McKee U.S. Patent 2,568,349 and in fact are conventional in the art.

The adhesive mixture 20 employed at the corrugating step may be the same adhesive as an adhesive mixture 21 later applied for the purpose of adhering a second liner 12 to the corrugated ply 10. Such mixtures consist of heat-activatable, free-water-containing adhesive mixtures having sufficient body to "stand up" momentarily on the tips of the corrugation until the liner or facing is pressed on into position. This necessary property of "body" is well recognized in the art. See, for example, Caesar et al. U.S. Patent 2,463,148 and "Technology of Adhesives" by John Delmonte, Reinhold Publishing Corp., 1947, p. 454. Examples of suitable adhesive mixtures of the starch, silicate, and silicate clay types recognized by the art as appropriate for corrugated box manufacture are to be found in the following United States patents:

| | |
|---|---|
| Bauer | 2,051,025 |
| Bauer | 2,102,937 |
| Maxwell | 2,182,524 |
| Champion et al. | 2,258,741 |
| Fenn | 2,372,666 |
| Vail et al. | 2,239,358 |
| Vail et al. | 2,205,609 |
| Boller | 2,232,162 |
| Boller et al. | 2,287,411 |

Reference is also made to the starch, silicate and silicate clay adhesive mixtures for corrugated paperboard discussed in "Technology of Adhesives," supra. All of these adhesive mixtures comprise a bodied unset heat-activatable free-water-containing adhesive mixture for application to the corrugated web of the paperboard and, as such, all of them constitute a wax-resist. All of them are contemplated by the present invention. It presently appears that the starch adhesive mixtures are preferable to the silicate and silicate clay mixtures.

Following the application of the wax-resist bodied unset heat-activatable adhesive mixture to the exposed crests of the corrugated web 10, a molten-wax paper-penetrant, such as paraffin, is applied to the exposed side of the corrugated web 10. It is prevented by the wax-resist character of the bodied unset adhesive mixture from directly contacting the surfaces of the crests of the web 10. It is also somehow prevented apparently by the wax-resist character of the free-water-containing adhesive mixture from acting as a barrier to the bonding contact of the adhesive mixture 21 with the liner or facer web 12.

The second liner web 12 is then applied to the corrugated web 10 in the conventional manner and the adhesive mixture 21 is set by the application of heat, as indicated. The application of heat may be accomplished at the conventional hot plate section at a double backer in a manner familiar to the art. Setting of the adhesive mixture into the final adhesive bond causes the adhesive to become permeable to the paper-penetrant which has been applied to the corrugated web 10, and the paper-penetrant may permeate outwardly from the corrugated web 10 to the liner web 12 (and also to the liner web 11).

The molten-wax is preferably applied by spraying or projecting it at the indicated station, although the invention also contemplates the possibility of brushing, dipping, or other applying operations.

The wax which is employed is a paper-penetrant moisture-resistance-enhancing wax. Paraffin or paraffin-type waxes or petroleum waxes may be employed, among others. The wax may be amorphous, crystalline or microcrystalline or combinations thereof, with or without additional modifiers or additives. There may be employed those "waxes" which are intended by the artisan when referring to wax impregnation of paperboard, see for example, "The Chemistry and Technology of Waxes," supra, p. 433 ff. Note the reference to "just plain wax" on page 442. Paraffin-polyethylene mixtures have been found to constitute a suitable meltable-wax paper-penetrant according to the present invention.

The wax should melt within a sufficiently low range or at a sufficiently low point to avoid premature actuation of the adhesive mixture 21. That is, the melting point of the wax should not be greatly in excess of the temperature at which the adhesive mixture 21 sets or gels. A typical gelling temperature for a starch adhesive is 145° F. A wax melting temperature of about 140° F. is preferred in this instance, although temperatures as high as 200° F. or more have been successfully used with starch adhesive when the amount of wax applied per given weight of paper is relatively low, say about 13 pounds per 1000 square feet of corrugated ply 10.

The melting point or melting range of the wax should exceed the environmental temperatures to which the final product will be subjected. Temperatures of 100° F. are very minimal. Minimum temperatures of 120° F. or 130° F. are more desirable lower limits.

The invention may be employed on corrugating lines running at normal production rates of about 175 to 300 or 400 feet per minute where the liner web 12 is subjected to adhesive-setting heat at a double backer (heated to 325° F.) along a length of 30 or 40 feet or more. All customarily used weights of webs may be employed including for example corrugated plies of 26 pounds per 1000 square feet (before corrugation) and liners of 26, 33, 42, 47, 69 or 90 pounds per 1000 square feet.

For a corrugated ply 10 weighing about 39 pounds per 1000 square feet (26 pounds per 1000 square feet prior to corrugation) there may be applied about 10 to 50 pounds of wax per 1000 square feet. A preferred range presently appears to be about 20 to 30 pounds of wax per 1000 square feet. For special applications the range may vary from 5 to 80 pounds of wax per 1000 square feet.

It will be understood that wax may be applied according to the invention only to selected areas of the paperboard being manufactured. In this connection the sprayer or coater at the wax applying station may be activated and deactivated as desired without interfering with the remainder of the manufacturing process. Thus changeover back and forth between the manufacture of unwaxed paperboard and waxed paperboard may be effected without shutting down the corrugating line. It will be readily understood that this is a great advantage from the production standpoint. At standard line speeds, even with fairly heavy application of molten-wax paper-penetrant, the wax penetrates to the surfaces of the liner webs to little or no extent during the time the paperboard is passing through the double backer. Full penetration and maximum strength of the corrugated paperboard may not develop for a matter of many hours following the corrugating and combining operation.

In some cases it may be desired to apply wax across only a portion of the width of the paperboard. This may be readily accomplished by deactivating a portion of the spraying device or other coating device. The spraying device may comprise merely a perforated or nozzled pipe or manifold to which molten-wax is supplied under sufficient pressure to project it to the exposed underside of the corrugated web 10. It may be located over a catch tank and portions of it may be deactivated simply by blocking some of the perforations or nozzles.

When a free-water-containing heat-activatable adhesive mixture is employed which is not of itself potentially moisture resistant, its moisture resistance is improved when it is employed in the manufacture of corrugated paperboard according to the present invention. The fact that wax migration occurs through the adhesive appears to be responsible for the increased moisture resistance of the adhesive. Of course, the invention may be used with free-water-containing heat-activatable adhesive mixtures which are of themselves potentially water resistant, for example, with starch adhesive mixtures which have been made potentially waterproof to greater or lesser degrees by additives such as resorcinol.

Means may be employed to limit the permeation of the wax by providing wax barriers. For example, this may be desirable to prevent an outer surface or surfaces of the board from becoming wax stained. Or it may be that additional cost of a wax barrier is more than offset by reduced usage of wax. Other reasons for limited outflow of wax may appear. The invention therefore contemplates the provision of barrier means such as a film of polyethylene combined in one or both of the liners 11 and 12 as an intermediate ply or outer ply.

Printing operations may be carried out in the interval existing after application and before full penetration of the wax. However presently the preferable practice is to carry out printing operations after penetration of the wax to the surface. These printing operations may be identical to or similar to those conventionally performed on corrugated paperboard which is not wax-impregnated.

An improved corrugated paperboard construction contemplated by the invention is shown in Figure 2. There is provided a corrugated paperboard having a corrugated medium 30 and single and double liners 31 and 32 respectively. The medium and liners 30—32 may be equivalent to or identical with the elements 10—12 identified in Figure 1. A heat-set adhesive bonds the crests of the corrugated medium 30 to the liners 31 and 32 as indicated. Such adhesive may be that resulting from setting of the adhesive mixture 20, 21.

Wax of the type previously described permeates the corrugated medium 30 and has a degree of concentration which exceeds that which obtains in equilibrium condition. In at least one and preferably both the liners 31 and 32, any wax which is present has a concentration which is less than that which obtains in equilibrium condition. Preferably wax is present in both the liners 31 and 32.

Equilibrium condition is schematically illustrated in Figure 3 and is that final unchanging wax distribution which ultimately results as between the three layers 30—32 after prolonged subjection of all three layers to elevated temperatures which are within the melting range of the wax. As indicated in Figure 3, at equilibrium condition the wax concentration is not necessarily identical in all three or any two of the layers. This is particularly likely if the layers are of unlike papers. For example semi-chemical paper is usually more absorbent than kraft paper, other factors being equal. This is apparently due to the smaller fibers in semi-chemical paper and the resultant larger specific surface (fiber surface area per unit weight). Even if the layers comprise the same paper, they may be treated with agents affecting their wax absorptiveness.

Corrugated paperboard constructed according to this aspect of the invention has improved strength as compared to corrugated paperboard of the prior art, particularly under adverse moisture conditions. For example, when submerged in water, the corrugated paperboard of the invention has markedly greater structural strength than another submerged corrugated paperboard employing the same kinds and amounts of paper, adhesive and wax but in which wax concentration in the various layers is not displaced from equilibrium condition in the manner taught herein.

This application is a continuation-in-part application with respect to my co-pending application Serial No. 732,047 filed April 30, 1958, now abandoned in favor of the present application.

The scope of the invention is not, of course, limited by the exemplificative details of the above disclosure.

What is claimed is:

1. The process for making a moisture resistant double-face corrugated paperboard comprising applying a wax-resist bodied unset heat-activatable adhesive mixture to the exposed crests of the corrugated web of single-face corrugated paperboard, thereupon applying to the exposed side of the corrugated web a molten-wax paper-penetrant which is prevented by the wax-resist character of the bodied unset adhesive mixture from directly contacting the surfaces of said crests, thereupon applying a second liner web to the exposed crests of the corrugated web and setting the adhesive mixture by application of heat.

2. The process for making a double-face corrugated paperboard, the moisture resistance and strength of which is significantly improved through the presence of wax penetrant directly applied to the corrugated web, comprising the steps of adhesively combining a first liner web and a corrugated web to provide a single-face board, then applying a wax-resist bodied unset heat-activatable adhesive mixture to the exposed crests of the corrugated web to provide a temporary wax barrier on the crests, thereupon applying to the exposed side of the corrugated web a molten-wax paper-penetrant which is prevented by the wax-resist character of the bodied unset adhesive mixture from directly contacting the surfaces of said crests, and is also prevented by the wax-resist character of the bodied unset adhesive mixture from acting as a barrier to the bonding contact of the adhesive mixture with a second liner web to be applied to said crests of the corrugated web, thereupon applying a second liner web to said crests of the corrugated web and applying heat, the adhesive mixture applied to said crests being thereby set while in sufficient contact with said corrugated web and second liner web to accomplish adequate bonding.

3. The process for making a double-face corrugated paperboard, the moisture resistance and strength of which is significantly improved through the presence of wax penetrant directly applied to the corrugated web, comprising applying a wax-resist bodied unset heat-activatable adhesive mixture to the exposed crests of the corrugated web of single-face corrugated paperboard, thereupon applying to the exposed side of the corrugated web a molten-wax paper-penetrant which is prevented by the wax-resist character of the bodied unset adhesive mixture from directly contacting the surfaces of said crests, and is also prevented by the wax-resist character of the bodied unset adhesive mixture from acting as a barrier to the bonding contact of the adhesive mixture with a second liner web to be applied to said crests of the corrugated web, thereupon applying a second liner web to said crests of the corrugated web and applying heat, the adhesive mixture applied to said crests being thereby set while in sufficient contact with said corrugated web and second liner web to accomplish adequate bonding and also thereby ceasing to be a wax-resist whereby molten-wax penetrant applied to the corrugated web may permeate outwardly from the corrugated web to the liner web means.

4. A moisture-resistant double-face corrugated paperboard comprising a corrugated medium and a single-face liner and a double-face liner, a heat-set adhesive bonding the crests of the corrugated medium to one of the liners, a wax absorbed in said corrugated paperboard, said wax having a degree of concentration in the corrugated medium which exceeds that which obtains in equilibrium condition.

5. A moisture-resistant double-face corrugated paperboard comprising a corrugated medium and a single-face liner and a double-face liner, a heat-set adhesive bonding the crests of the corrugated medium to one of the liners, a wax absorbed in said corrugated paperboard, said wax having a degree of concentration in the corrugated medium which exceeds that which obtains in equilibrium condition, at least one of the single-face and double-face liners having a lesser concentration of said wax than that which obtains in equilibrium condition.

6. A moisture-resistant double-face corrugated paperboard comprising a corrugated medium and a single-face liner and a double-face liner, a heat-set adhesive bonding the crests of the corrugated medium to one of the liners, a wax absorbed in said corrugated medium and said single-face and double-face liners, said wax having a degree of concentration in the corrugated medium which exceeds that which obtains in equilibrium condition, the single-face and double-face liners each having a lesser concentration of said wax than that which obtains in equilibrium condition.

References Cited in the file of this patent

UNITED STATES PATENTS

| | | |
|---|---|---|
| 591,299 | Simonson | Oct. 5, 1897 |
| 1,199,508 | Swift | Sept. 26, 1916 |
| 1,408,746 | Kick | Mar. 7, 1922 |
| 2,099,301 | Hamersley et al. | Nov. 16, 1937 |
| 2,341,845 | Mark et al. | Feb. 15, 1944 |
| 2,568,349 | McKee | Sept. 18, 1951 |
| 2,610,136 | Casey et al. | Sept. 9, 1952 |
| 2,824,037 | King | Feb. 18, 1958 |

FOREIGN PATENTS

| | | |
|---|---|---|
| 22,804 | Great Britain | 1897 |